2,945,034
ORTHO-HYDROXY-N-BETA-MORPHOLINO-PROPIOPHENONE FUNGICIDES

Carlo Giuseppe Alberti, Alberto Vercellone, Aurelio Di Marco, and Mario Ghione, all of Milan, Italy, assignors to Società Farmaceutici Italia, Milan, Italy, a corporation of Italy No Drawing. Filed Dec. 9, 1958, Ser. No. 779,075

Claims priority, application Italy Mar. 12, 1955

4 Claims. (Cl. 260—247.7)

This invention relates to a new group of synthetic compounds having pronounced fungicidal properties. The invention particularly concerns N-morpholine propionyl compounds of the general formula:

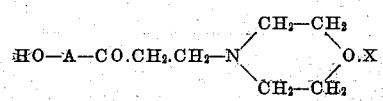

in which X is an acid molecule moiety, and also the corresponding free bases in which X is absent. This application is a continuation-in-part of our application Serial No. 567,074, filed Feruary 23, 1956, subsequently abandoned.

In said general formula the compounds of particular present interest are those in which A is an isocyclic radical, such as the benzene radical, which may be further substituted by halogen and alkyl, particularly lower alkyl with no more than four carbon atoms. Nitro substituents of A, and heterocyclic nuclei at, or as, A, are also within the broader purview.

Compounds of this class were found to present powerful fungicides, particularly against *Aspergillus niger, Candida albicans, Alternaria solani, Penicillium notatum, Fusarium dimerum* and *Helmintosporium oryzae*.

The process of preparing these products consists in reacting a compound of the general formula

with morpholine hydrochloride and paraformaldehyde by boiling in ethanol, if necessary in the presence of a small amount of concentrated hydrochloric acid. The paraformaldehyde may be replaced by equivalent amounts of aqueous formaldehyde. The heating is extended to 1 to 10 hours; at the end of this period the reaction product crystallizes directly or after concentrating the solution.

It is, therefore, the main object of the present invention to provide compounds of the afore-mentioned general formula.

It is another object of this invention to provide a method of preparing these new compounds.

It is still another object of the invention to employ compounds of this type as fungicides.

These and other objects will appear from the following examples presented to illustrate the invention, without the intention, however, of thereby limiting the scope of the appended claims.

*Example 1.*—3.7 gr. of 2-hydroxy-4-methyl-5-chloro-acetophenone, dissolved in 15 cc. of 95% ethanol, are refluxed for 6 hours with 2.6 gr. of morpholine hydrochloride, 1.2 gr. of paraformaldehyde and 0.1 cc. of concentrated hydrochloric acid. The clear reaction mixture is filtered hot from the undissolved portion, consisting of the unchanged starting product, and the precipitate obtained upon cooling is separated; it consists of 2 - hydroxy - 4 - methyl-5-chloro-β-N-morpholine-propiophenone hydrochloride, that, after recrystallization from methanol-water (2:1) has a M.P. of 194–195° C. and corresponds with the formula

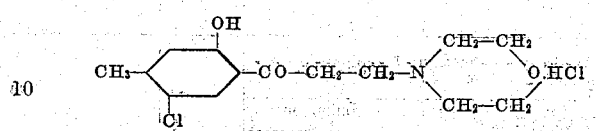

*Example 2.*—5.34 gr. of o-hydroxy-acetophenone, dissolved in 12 cc. of 95% ethanol, are refluxed for 6 hours with 5.0 gr. of morpholine hydrochloride and 1.8 gr. of paraformaldehyde. A supersaturated solution is obtained, from which o-hydroxy-β-N-morpholine-propiophenone hydrochloride crystallizes upon rubbing the wall of the reaction vessel. After crystallization from methanol-water (2:1), this compound has a M.P. of 195–197° C. It corresponds to the formula

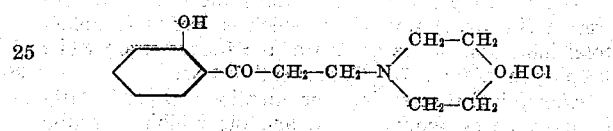

*Example 3.*—The foregoing example is repeated with the exception that, by using m-hydroxy-acetophenone, m-hydroxy-β-N-morpholine-propiophenone hydrochloride is obtained, having a M.P. of 186–187° C., and of the formula

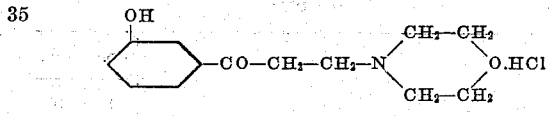

*Example 4.*—5.34 gr. of p-hydroxy-acetophenone are boiled for 2 hours in 12 cc. of absolute alcohol with 5.0 gr. of morpholine hydrochloride, 1.8 gr. of paraformaldehyde and 0.1 cc. of concentrated hydrochloric acid. p-Hydroxy-β-N-moropholine-propiophenone hydrochloride, having a M.P. of 215–217° C., crystallizes upon cooling and is recrystallized from methanol. It has the formula

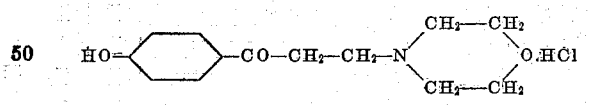

*Example 5.*—1.87 gr. of 5-acetyl-8-hydroxyquinoline are boiled for 4 hours with 1.30 gr. of morpholine hydrochloride and 0.6 gr. of paraformaldehyde in 10 cc. of absolute ethanol. The hydrochloride of 5-(β-N-morpholine-propionyl)-8-hydroxy-quinoline is separated and recrystallized from ethanol. It has a M.P. of 205° C. (decomposition) and corresponds to the formula

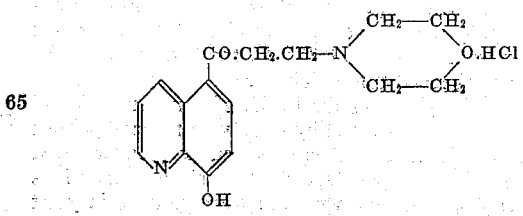

The following compounds described above were subjected to a premliminary screening to establish their fungicidal activity. The following results (Table I) were obtained:

TABLE I

| Compound | Lowest Inhibiting Dose (L. I. D.) ($\gamma$/cc.) | | | | | |
|---|---|---|---|---|---|---|
| | Alternaria solani | Aspergillus nigger | Candida albicans | Penicillium notatum | Fusarium dimerum | Helmintosporium oryzae |
| 2-Hydroxy-4-methyl-5-chloro-$\beta$-N-morpholino propiophenone hydrochloride (I) | 12 | 100 | 100 | 100 | 50 | 50 |
| 0.Hydroxy-$\beta$-N-morpholino propiophenone hydrochloride (II) | 12 | 30 | 12 | 25 | 12 | 12 |
| m.Hydroxy-$\beta$-N-morpholino propiophenone hydrochloride (III) | 200 | 1,600 | 400 | 400 | 200 | 200 |
| p.Hydroxy-$\beta$-N-morpholino propiophenone hydrochloride (IV) | 400 | 800 | 500 | 800 | 300 | 200 |

10 cm. diameter plates were prepared with increasing dilutions of the tested materials in potato agar. A suspension of spores withdrawn from an 8-days culture of the fungus strain was deposited by streaking on the solidified agar surface.

As lowest inhibiting dose (L.I.D.) the lowest concentration (in $\gamma$/cc.) was taken, which is needed to obtain total inhibition of the growth of the fungus strain while keeping the plate at 28° C. during 5–7 days.

After this first screening, our attention was particularly centered on compounds I, II, and the inhibiting action thereof (at 100 $\gamma$/cc.) on a series of pathogenic fungi strains was determined. The results are reported in Table II where inhibiting action is indicated by (+), absence thereof by (—), and (±) indicates a subinhibiting action.

TABLE II

| Strain | Compound | |
|---|---|---|
| | I | II |
| Debaryomyces canensis | + | — |
| Debaryomyces guillermondii | + | + |
| Debaryomyces hudeloi | + | + |
| Debaryomyces marylandii | + | + |
| Debaryomyces neoformans | ± | ± |
| Debaryomyces tyrocola | + | + |
| Epidermophyton interdigitale | + | + |
| Glenospora graphii | + | + |
| Glenosporella dermatitidis | + | + |
| Histoplasma capsulatum | + | + |
| Pseudomycoderma matalense | + | + |
| Torulopsis neoformans | + | + |
| Tricophyton maggini | + | + |
| Tricophyton plicatile | + | — |
| Actinomyces Boströmi Vitt | + | — |
| Actinomyces Boströmi (NW) | — | — |
| Actinomyces Boströmi A | — | — |
| Actinomyces Boströmi P | — | — |
| Nocardia asteroides | ± | ± |

For said determination the following technique was adopted: an agar-Sabouraud substrate is prepared, containing 100 $\gamma$/cc. of the tested compound. Then the molten substrate is poured in 14 cm. diameter Petri plates (25 ml. per plate) and let to solidify.

The fungi strains (a drop of spores suspension or a mycelium fragment) are sown upon the substrate surface; the plates are incubated at 37° C. for 8 days when the samples are checked for inhibition.

For some fungi strains the L.I.D. of compounds I and II has been also determined by dissolving the compounds at increasing dilutions in a liquid substrate (yeast broth), and seeding the tubes with spore or mycelium suspensions of the test strains withdrawn from fresh cultures in yeast broth.

After 6 days of incubation at 37° C., the L.I.D. of the compounds (in $\gamma$/cc.) which inhibits the growth of the tested strain has been checked.

TABLE III

| Strain | L.I.D. ($\gamma$/cc.) | |
|---|---|---|
| | I | II |
| Epidermophyton floccosum | >100 | 100 |
| Glenospora graphii | >100 | 100 |
| Sabouraudites gypseus | 10 | 2.5 |
| Tricophyton metagrophytes | 2.5 | 10 |
| Actinomyces boströmi A | 25 | 10 |
| Sarcina lutea | 5 | 25 (±5) |
| Nocardia asteroides | 25(±10) | 25 |

Compound I has been also examined in comparison with aluminum-8-hydroxyquinolate. The results are summarized in Table IV, wherein the L.I.D.s in $\gamma$/cc. are reported, obtained in liquid substrate (yeast broth) after inoculation of 8–10 days old, 1:10 diluted cultures and after 48–96 hours incubation at 38° C.

TABLE IV

| Strains | L.I.D. ($\gamma$/cc.) | | | |
|---|---|---|---|---|
| | I | | Al-8.hydroxyquinolates | |
| | 48 h. | 96 h. | 48 h. | 96 h. |
| Debaryomices hudeloi | 50 | 50 | 50 | 50 |
| Epidermophyton floccosum | 25 | 50 | >50 | >50 |
| Glenospora graphii | 25 | 50 | >50 | >50 |
| Tricophyton radians | 5 | 50 | 50 | 50 |
| Oidium albicans | 25 | 50 | 50 | 50 |
| Actinomyces boströmi Vitt | 5 | 25 | 50 | 50 |

Compound I has been also tested as an agricultural fungicide, particularly as to its surface fungicidal activity which proved to be outstanding.

The term "surface fungicidal activity" is to define the action displayed by the compound when sprayed on the leaves or other parts of the plants which are to be protected.

For this purpose, a test method has been adopted which consists in atomizing 15 days old bean seedlings which subsequently are infected, through the leaves, with spores of bean mildew (*Uromyces appendiculatus*).

The following results have been obtained:
Concentration 0.03%: complete protection; no phytotoxicity phenomenon is observed.

Concentration 0.01%: substantial decrease in infection.
Concentration 0.005%: loss of activity.

The best known fungicides for inhibition of bean mildew are able to protect against the infection only at much higher concentrations:

| | Percent |
|---|---|
| Thiocarbamates (f.i.Zimeb:Zinc ethylene - bisdithiocarbamate) | 0.2–0.3 |
| Karathane (2,4 - dinitro - 6 - caprylphenolcrotonate) | 0.3 |
| Captane (N-trichloromethylthio-tetrahydrophthalimide) | 0.3 |
| Wettable sulfur | 0.25 |
| Copper salts | inefficient |

As a conclusion of the foregoing test results it may be stated that 2-hydroxy-4-methyl-5-chloro-β-N-morpholino propiophenone hydrochloride and o.hydroxy-β-N-morpholino propiophenone hydrochloride are outstanding in that they exhibit an unexpectedly high fungicidal activity.

The preparation of free bases corresponding to each of five salts described above is accomplished by treatment of the corresponding hydrochloride, or other salt thereof, with a base. This is exemplified as follows:

Example 6.—100 grams of ortho-hydroxy-β-N-morpholine-propiophenone hydrochloride, hereafter designated B.18 for convenience, of the formula shown in Example 2, are dissolved in 2500 ml. water and treated at room temperature, while stirring, with 400 ml. 10% sodium bicarbonate. After filtering and washing with distillated water until the chloro-ions have disappeared from the washing water, the product is dried at 35° C. under vacuum—M.P. 54–56° C.

The product is the corresponding free base, namely ortho-hydroxy-β-N-morpholine propiophenone, hereafter designated C.70. The following comparative tests were made on the base C.70 and its hydrochloride B.18.

*Test No. 1.—Fungicidal activity in vitro against phytopathogenic fungi*

The fungicidal activity of the base C.70 and of its hydrochloride (B.18) has been tested in Petri dishes, by the method of incorporated agar, against the following agents of parasitical plant diseases: *Deuterophoma tracheiphila* Petri, *Verticillium dahliae* Kleb; *Verticillium albo-atrum* Reinke & Berth, *Alternaria tenuis* Nees, *Endothia parasitice* (Murr.) Anderson, *Fusarium oxysporium* Schlecht, *Fusarium solari* (Mart.) App. & Wz., *Graphium ulmi* Schwarz and *Cercospora beticola* Sacc.

The compound B.18 was tested in aqueous solution sterilized by filtration on Seitz Eks, whereas the compound C.70 was tested in acetone solution. For each test the relative controls either with water or acetone have been made. In Tables I' and II' the data are reported relating to the growth of fungi and noticed 5 and 10 days after the sowing. The compound C.70 has proved to be able to display, on all the tested fungi, an activity substantially not dissimilar from the one of B.18.

*Test No. 2.—Influence on the germination of Alternaria tenuis conidia*

For this test a 4 days aged culture on agar-carrot decoction has been employed; the products to be tested are applied onto slides by means of a microsyringe and thereon calibrated drops of conidia suspensions have been applied. The incubation at 21° C. was prolonged for about 16 hours.

In Table III' the percent values of lacking germination are reported for the respective concentrations of the products.

C.70: LD 50=76 p.p.m.; LD 95=190 p.p.m.
B.18: LD 50=98 p.p.m.; LD 95=225 p.p.m.

*Test No. 3.—Inflence on the germination of conidia of* Venturia pirina *(Fusicladium virescens (Bref.) Aderh.), agent for the pear mouldiness ("spotting")*

The sampling of conidia was made directly from infected pear leaves at land; the products were tested on slides as for the Test No. 2.

In Table IV' are summarized the percent values of lacking germination of *Venturia pirina* for the respective concentrations of the products.

C.70: LD=62 p.p.m.; LD 95=85 p.p.m.
B.18: LD=54 p.p.m.; LD 95=85 p.p.m.

*Test No. 4.—Fungicidal activity "in vivo" against the bean rust* (Uromyces appendiculatus (Pers.) link)

About 30 days aged bean plants with only the two primary leaves have been utilized. An aqueous suspension of C.70 and an aqueous solution of B.18 have been sprayed on the underlying side whereon, 24 hours after treatment, the infection has been effected with suspension of uredospores withdrawn from leaves of previously infected plants. Soon after the infection, the plants have been kept for 48 hours in a moisture saturated room, then transferred to a green house at 26° C.; the reading of the results has been made 10 days after the infection. Finally in Table V' the fungicidal activity of both compounds tested on bean plants against *Uromyces appendiculates* is reported, as well as the percent of disease referred to controls.

TABLE I'

*Growth of pathogenic fungi in the presence of C.70 and B.18—Method of "incorporated-agar"—data noticed after 5 days*

| Fungi | Products | Concentrations, p.p.m. | | | | | Controls | |
|---|---|---|---|---|---|---|---|---|
| | | 20 | 10 | 5 | 2 | 1 | Water | Acetone |
| Deuterophoma tracheiphila | C 70 | ----- | ----- | ----- | ----- | (+)----- | ++(+)-- | ++(+)-- |
| | B 18 | ----- | ----- | (+)----- | ++--- | ++(+)-- | | |
| Verticillium dahliae | C 70 | ----- | ----- | ----- | ----- | (+)----- | +++++ | +++++ |
| | B 18 | ----- | ----- | (+)----- | ++--- | +++++ | | |
| Verticillium albo-atrum | C 70 | ----- | ----- | ----- | ----- | ----- | +++++ | +++++ |
| | B 18 | ----- | ----- | ----- | (+)----- | ++--- | | |
| Alternaria tenuis | C 70 | ----- | ----- | +---- | +++-- | +++++ | +++++ | +++++ |
| | B 18 | ----- | +++-- | +++++ | +++++ | +++++ | | |
| Endothia parasitica | C 70 | ----- | ----- | ----- | ----- | +---- | ++++- | +++-- |
| | B 18 | ----- | ----- | (+)----- | (+)----- | ----- | | |
| Fusarium oxysporium | C 70 | ----- | ----- | ----- | ++--- | +++++ | +++++ | +++-- |
| | B 18 | ----- | ----- | ----- | ++--- | +++++ | | |
| Fusarium solani | C 70 | ----- | ----- | ++--- | ++--- | +++++ | +++++ | +++++ |
| | B 18 | ----- | ----- | ----- | ++--- | +++++ | | |
| Graphium ulmi | C 70 | ----- | ----- | (+)++++ | ++--- | +++++ | +++++ | +++++ |
| | B 18 | ----- | ----- | ----- | ----- | ----- | | |
| Cercospora beticola | C 70 | ----- | ----- | ----- | ----- | ----- | +++-- | +++-- |
| | B 18 | ----- | ----- | ----- | ----- | (+)----- | | |

Legends: -----=Full inhibition of growth of the tested microorganism. +++++=Full growth of the microorganism.

TABLE II'

*Growth of pathogenic fungi in the presence of C.70 and B.18—Method of "incorporated-agar"—data noticed after 10 days*

| Fungi | Products | Concentrations, p.p.m. | | | | | Controls | |
|---|---|---|---|---|---|---|---|---|
| | | 20 | 10 | 5 | 2 | 1 | Water | Acetone |
| Deuterophoma tracheiphila | C 70 | ----- | ----- | ----- | +---- | +++-- | +++++ | +++++ |
| | B 18 | ----- | ----- | +++-- | ++++- | ++++- | +++++ | +++++ |
| Verticillium dahliae | C 70 | ----- | ----- | ----- | +---- | +++-- | +++++ | +++++ |
| | B 18 | ----- | ----- | +---- | +++-- | +++++ | +++++ | +++++ |
| Verticillium albo-atrum | C 70 | ----- | ----- | ----- | ----- | (+)--- | +++++ | +++++ |
| | B 18 | ----- | ----- | ----- | ----- | ----- | +++++ | +++++ |
| Alternaria tenuis | C 70 | ----- | +++-- | ++--- | +++++ | +++++ | +++++ | +++++ |
| | B 18 | ----- | +++-- | +++++ | +++++ | +++++ | +++++ | +++++ |
| Endothia parasitica | C 70 | ----- | ----- | (+)--- | +---- | +---- | +++++ | +++++ |
| | B 18 | ----- | ----- | ----- | ----- | ----- | +++++ | +++++ |
| Fusarium oxysporium | C 70 | ----- | ----- | ----- | +++++ | +++++ | +++++ | +++++ |
| | B 18 | ----- | ----- | ----- | +++++ | +++++ | +++++ | +++++ |
| Fusarium solani | C 70 | ----- | ----- | +++-- | +++++ | +++++ | +++++ | +++++ |
| | B 18 | ----- | ----- | +++-- | +++++ | +++++ | +++++ | +++++ |
| Graphium ulmi | C 70 | ----- | ----- | +---- | +++-- | (+)--- | +++++ | +++++ |
| | B 18 | ----- | ----- | ----- | ----- | +---- | +++++ | +++++ |
| Cercospora beticola | C 70 | ----- | ----- | ----- | (+)--- | +---- | +++++ | +++++ |
| | B 18 | ----- | ----- | ----- | ----- | ----- | +++++ | +++++ |

Legends: ------ = Full inhibition of growth of the tested microorganism. +++++ = Full growth of the microorganism.

TABLE III'

*Influence of C.70 and B.18 on the germination of Alternaria tenuis conidia*

| Concentration (p.p.m.) | Percent of lacking germination | |
|---|---|---|
| | C 70 | B 18 |
| 160 | 91 | 92 |
| 140 | 85 | 77 |
| 120 | 79 | 64 |
| 100 | 68 | 45 |
| 90 | 58 | 38 |
| 80 | 55 | 30 |
| 70 | 46 | 25 |
| 60 | 32 | 9 |
| 50 | 25 | 0 |
| 40 | 9 | 0 |
| Control H₂O | 0 | |
| Control acetone | 0 | |

TABLE IV'

*Influence of C.70 and B.18 on the germination of Venturia pirina conidia (f.c. Fusicladium virescens). Method of the drop on slide.*

| Concentration (p.p.m.) | Percent of lacking germination | |
|---|---|---|
| | C 70 | B 18 |
| 100 | 100 | 100 |
| 80 | 76 | 79 |
| 60 | 45 | 55 |
| 50 | 35 | 46 |
| 40 | 31 | 28 |
| 30 | 7 | 20 |
| 20 | 2 | 10 |
| Control H₂O | 0 | |
| Control acetone | 0 | |

TABLE V'

*Fungicidal activity of C.70 and B.18 on bean plants against Uromyces appendiculatus. Average data of 6 repetitions*

| Concentrations, Percent | No. of treated leaves | | No. spots | | No. spots referred to 100 leaves | | Percent disease referred to controls | |
|---|---|---|---|---|---|---|---|---|
| | C 70 | B 18 | C 70 | B 18 | C 70 | B 18 | C 70 | B 18 |
| 0.2500 | 6 | 6 | 0 | 0 | 0 | 0 | 0 | 0 |
| 0.1250 | 6 | 6 | 584 | 185 | 9,700 | 3,000 | 4.8 | 1.5 |
| 0.0625 | 6 | 6 | 3,284 | 1,302 | 54,700 | 21,700 | 27.3 | 10.8 |
| Controls | 6 | | 12.000 | | 200.000 | | 100 | |

The following examples relate also to the obtainment of free bases from the hydrochlorides.

*Example 7.* — 5 - (β - N-morpholino-propionyl)-β-oxyquinoline

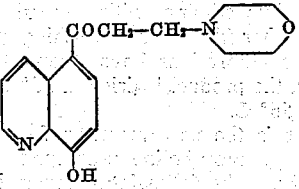

To 3.23 g. of the hydrochloride dissolved in 100 ml. of water 0.9 g. NaHCO₃ dissolved in 9 ml. water are added under stirring. After 1 hour the yellow product is filtered and finally washed with distilled water; the product melts at 162–164° C. The product crystallizes from methanol.

*Example 8.* — 2 - oxy-4-methyl-5-chloro-β-N-morpholino-propiophenone

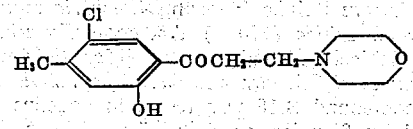

A filtered solution of 3.2 g. hydrochloride in 500 ml. water is treated under stirring and at 10° C. with 0.9 g. NaHCO₃ in 9 ml. water. After 1 hour the white product is filtered and washed with distilled water. The product melts at 90–91° C., and crystallizes from aqueous methanol.

*Example 9.* — 4-oxy-β-N-morpholino-propiophenone

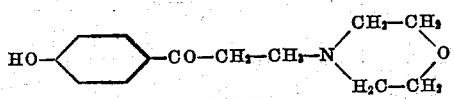

1 g. of the hydrochloride is dissolved on the water bath in 25 ml. water. To the filtered solution 0.31 g. NaHCO₃ previously dissolved in 5 ml. water are added.

After said addition white bright leaflets precipitate, which are crystallized from 4 ml. water-methanol (1:1); M.P. 132.5–134° C.

Other salts are within the purview of the invention. Their preparation is obvious to chemists, for example by treatment of the free bases with other acids, i.e. inorganic, viz. mineral, or organic acids, and by direct synthesis analogous to that of the hydrochlorides.

We claim:
1. As fungicidal compounds, the compounds of the group consisting of ortho hydroxy N-beta-morpholino-propiophenones of the following formula:

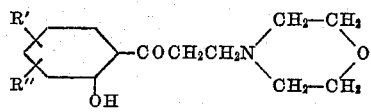

in which R', R" represent members of the group consisting of hydrogen, halogen, and lower alkyl radicals, and the hydrochloride salts thereof.

2. As a fungicidal, 2-hydroxy-4-methyl-5-chloro-beta-N-morpholine-propiophenone hydrochloride, of the formula

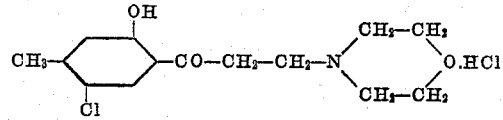

3. As a fungicidal, ortho-hydroxy-beta-N-morpholine-propiophenone hydrochloride, of the formula

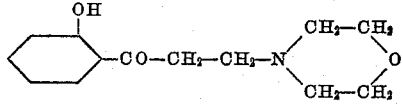

4. As a fungicidal, ortho-hydroxy-beta-N-morpholine-propiophenone, of the formula References Cited in the file of this patent
UNITED STATES PATENTS

| | | |
|---|---|---|
| 2,040,039 | Bruson | May 5, 1936 |
| 2,282,907 | ter Horst | May 12, 1942 |
| 2,606,208 | Burtner | Aug. 5, 1952 |
| 2,716,121 | Denton | Aug. 23, 1955 |
| 2,723,269 | Denton | Nov. 8, 1955 |
| 2,778,853 | Schultz | Jan. 22, 1957 |

OTHER REFERENCES

Takachiyo et al.: Jour. Pharm. Soc., Japan, vol. 76, pp. 1–3 (1956).